United States Patent
Oh et al.

(10) Patent No.: US 9,097,446 B2
(45) Date of Patent: Aug. 4, 2015

(54) AIR-CONDITIONING APPARATUS FOR VEHICLE

(71) Applicants: Hyundai Motor Company, Seoul (KR); KBAUTOTECH CO., LTD., Asan, Chungcheongnam-do (KR)

(72) Inventors: Man Ju Oh, Gyeonggi-do (KR); Jae Woong Kim, Gyeonggi-do (KR); Jae Woo Park, Gyeonggi-do (KR); Jae Hoon Kim, Chungcheongnam-do (KR)

(73) Assignees: Hyundai Motor Company, Seoul (KR); Kbautotech Co., Ltd., Asan, Chungcheongnam-do (KR)

( * ) Notice: Subject to any disclaimer, the term of this patent is extended or adjusted under 35 U.S.C. 154(b) by 253 days.

(21) Appl. No.: 13/838,967

(22) Filed: Mar. 15, 2013

(65) Prior Publication Data
US 2014/0165606 A1 Jun. 19, 2014

(30) Foreign Application Priority Data
Dec. 14, 2012 (KR) .......................... 10-2012-0146846

(51) Int. Cl.
*F25B 21/02* (2006.01)
*B60H 1/00* (2006.01)

(52) U.S. Cl.
CPC ............ *F25B 21/02* (2013.01); *B60H 1/00478* (2013.01); *F25B 2321/0252* (2013.01)

(58) Field of Classification Search
CPC ............ F25B 21/02; F25B 2321/0252; B60H 1/00478; B60H 1/00642; B60H 1/004; B60H 1/00457; B60H 1/32
USPC ................ 62/3.3, 3.61, 3.7, 239, 244, 323.3, 62/324.2; 165/59, 80.4, 42
See application file for complete search history.

(56) References Cited

U.S. PATENT DOCUMENTS

| | | | | |
|---|---|---|---|---|
| 4,718,249 A | * | 1/1988 | Hanson | 62/263 |
| 6,272,873 B1 | * | 8/2001 | Bass | 62/238.3 |
| 2005/0247446 A1 | * | 11/2005 | Gawthrop | 165/202 |
| 2006/0173344 A1 | * | 8/2006 | Marian et al. | 600/459 |

(Continued)

FOREIGN PATENT DOCUMENTS

| | | |
|---|---|---|
| JP | 2010-195287 A | 9/2010 |
| JP | 2011-143911 A | 7/2011 |

(Continued)

*Primary Examiner* — Mohammad M Ali
(74) *Attorney, Agent, or Firm* — Mintz Levin Cohn Ferris Glovsky and Popeo, P.C.; Peter F. Corless

(57) ABSTRACT

An air-conditioning apparatus for a vehicle, which includes an evaporator core and a heater core disposed on a ventilation channel overlapping each other, and thermoelectric device having a heat generating surface and a heat absorbing surface. A cooling line including a first cooling channel through which cooling water circulates around the heat absorbing surface and the evaporator core and a second cooling channel through which the cooling water circulates around the heat absorbing surface and an engine, and a heating line including a first heating channel through which the cooling water circulates around the heat generating surface and the heater core and a second heating channel through which the cooling water circulates around the engine and the heater core are also included. A controller controls concurrent circulation through the second cooling channel and the first heating channel or circulation through the second heating channel in a heating mode.

12 Claims, 4 Drawing Sheets

(56) References Cited

U.S. PATENT DOCUMENTS

| | | | |
|---|---|---|---|
| 2007/0033951 A1* | 2/2007 | Goenka et al. | 62/3.7 |
| 2008/0028768 A1* | 2/2008 | Goenka | 62/3.2 |
| 2008/0155993 A1* | 7/2008 | Kuehl | 62/3.6 |
| 2009/0205342 A1* | 8/2009 | Jang et al. | 62/3.3 |
| 2010/0293966 A1* | 11/2010 | Yokomachi et al. | 62/3.2 |
| 2011/0120146 A1* | 5/2011 | Ota et al. | 62/3.3 |
| 2011/0214838 A1* | 9/2011 | Akiyama et al. | 165/41 |
| 2012/0079835 A1* | 4/2012 | Oh et al. | 62/3.2 |
| 2012/0111027 A1* | 5/2012 | Campbell et al. | 62/3.3 |

FOREIGN PATENT DOCUMENTS

| | | |
|---|---|---|
| KR | 10-2007-0077546 A | 7/2007 |
| KR | 10-2008-0008867 A | 1/2008 |
| KR | 10-2008-0008875 A | 1/2008 |
| KR | 10-2009-0062143   | 6/2009 |
| KR | 10-2009-0062143 A | 6/2009 |

* cited by examiner

AIR-CONDITIONING APPARATUS FOR VEHICLE

CROSS-REFERENCE TO RELATED APPLICATION

This application claims under 35 U.S.C. §119(a) the benefit of Korean Patent Application No. 10-2012-0146846 filed Dec. 14, 2012, the entire contents of which are incorporated herein by reference.

BACKGROUND

1. Field of the Invention

The present invention relates to an air-conditioning apparatus for a vehicle, which uses a thermoelectric device rather than a refrigerant.

2. Description of the Related Art

Conventional air conditioning systems use a refrigerant in a cooling system to cool the air as it passes therethrough. More specifically, the system cools air by rotating a compressor to conduct compression, liquefaction, and evaporation on the refrigerant and heats the air by operating a positive temperature coefficient (PTC) heater. However, the use of refrigerant has added to the effects on global warming. Air conditioning systems (including a hot gas system) using the refrigerant require mechanical power, convert electrical energy into mechanical energy, and perform heating and cooling. Thus, mechanical loss as well as quality issues caused by mechanical parts and leakage of the refrigerant are in need of improvement.

An air-conditioning apparatus using thermoelectric devices in related art have been proposed to minimize a temperature difference between opposite surfaces of the thermoelectric device to improve efficiency through the use of a thermoelectric device. However, even on the basis of this technology, an air-conditioning system using cooling water and the thermoelectric device is still only at its rudimentary level. As such, there is a problem associated with the overall heat control of a vehicle, a new system capable of replacing both an existing air-conditioning system and an existing heat-radiating system has yet to be proposed.

The foregoing is intended merely to aid in the understanding of the background of the present invention, and is not intended to mean that the present invention falls within the purview of the related art that is already known to those skilled in the art.

SUMMARY

Accordingly, the present invention has been made keeping in mind the above problems occurring in the related art, and the present invention provides an air-conditioning apparatus for a vehicle which is capable of operating both an air-conditioning system and a vehicle cooling system using only cooling water with a refrigerant removed from an existing refrigerant-based air-conditioning system.

In order to achieve the above object, according to an aspect of the present invention, there is provided an air-conditioning apparatus for a vehicle, which includes an evaporator core and a heater core disposed on a ventilation channel in an overlapped state, a thermoelectric device having a heat generating surface and a heat absorbing surface, a cooling line made up of a first cooling channel through which cooling water circulates around the heat absorbing surface and the evaporator core and a second cooling channel through which the cooling water circulates around the heat absorbing surface and an engine, a heating line made up of a first heating channel through which the cooling water circulates around the heat generating surface and the heater core and a second heating channel through which the cooling water circulates around the engine and the heater core. A controller controls concurrent circulation through the second cooling channel and the first heating channel or circulation through the second heating channel in a heating mode. Likewise, the controller may control circulation through the first cooling channel in a cooling mode.

According to another aspect of the present invention, there is provided an air-conditioning apparatus for a vehicle, which includes an evaporator core and a heater core disposed on a ventilation channel in an overlapped state, a thermoelectric device having a heat generating surface and a heat absorbing surface, a cooling line made up of a first cooling channel through which cooling water circulates around the heat absorbing surface and the evaporator core and a second cooling channel through which the cooling water circulates around the heat absorbing surface and an engine, a heating line made up of a first heating channel through which the cooling water circulates around the heat generating surface and the heater core and a second heating channel through which the cooling water circulates around the engine and the heater core, a radiating line made up of a first radiating channel through which the cooling water circulates around the heat generating surface and a radiator and a second radiating channel through which the cooling water circulates around the engine and the radiator.

A controller may be configured to control the circulation through the first cooling channel, the first radiating channel, and the second radiating channel in a cooling mode. Likewise, the controller may be configured to control circulation through the second radiating channel, the first cooling channel, and the first heating channel in a dehumidifying mode. Further, the controller may be configured to control concurrent circulation through the second cooling channel and the first heating channel or circulation through the second heating channel in a heating mode.

Also, the first cooling channel and the second cooling channel may be connected in parallel so as to share input and output sides of the heat absorbing surface, and a 3-way valve may be installed at a branch point of the output side of the heat absorbing surface. Further, the first cooling channel may include a water pump.

Additionally, the first heating channel and the first radiating channel may be connected in parallel so as to share input and output sides of the heat generating surface, and a 3-way valve may be installed at a branch point of the output side of the heat generating surface. The water pump may be installed between a joining point of the input side of the heat generating surface and the heat generating surface.

The second cooling channel and the second radiating channel may also be connected in parallel so as to share an inlet and outlet of the engine, and a 3-way valve may be installed at a joining point of the inlet side of the engine. Further, the second heating channel may be formed at the outlet side of the engine so that the second cooling channel diverges therefrom through a 3-way valve.

In addition, the first heating channel and the second heating channel may be connected in parallel to share an inlet and outlet of the heater core, and a 3-way valve may be installed at a branch point of the outlet side of the heater core.

According to the air-conditioning apparatus having the above-mentioned configuration, both an air-conditioning system and a vehicle cooling system can be operated together using only the cooling water with a refrigerant removed from an existing refrigerant-based air-conditioning apparatus. As a result, the refrigerant is replaced with the cooling water to impart environmental effects. Furthermore, an air-conditioning system for an interior of the vehicle as well as the cooling system for an engine is provided, and optimized heat control is performed by a compact system. Thereby, waste heat can be reduced, and waste of energy can be prevented.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Additionally, it is understood that the below methods are executed by at least one controller. The term controller refers to a hardware device that includes a memory and a processor. The memory is configured to store the modules and the processor is specifically configured to execute said modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinafter, an air-conditioning apparatus for a vehicle according to an exemplary embodiment of the present invention will be described in detail with reference to the accompanying drawings.

Figure 1:
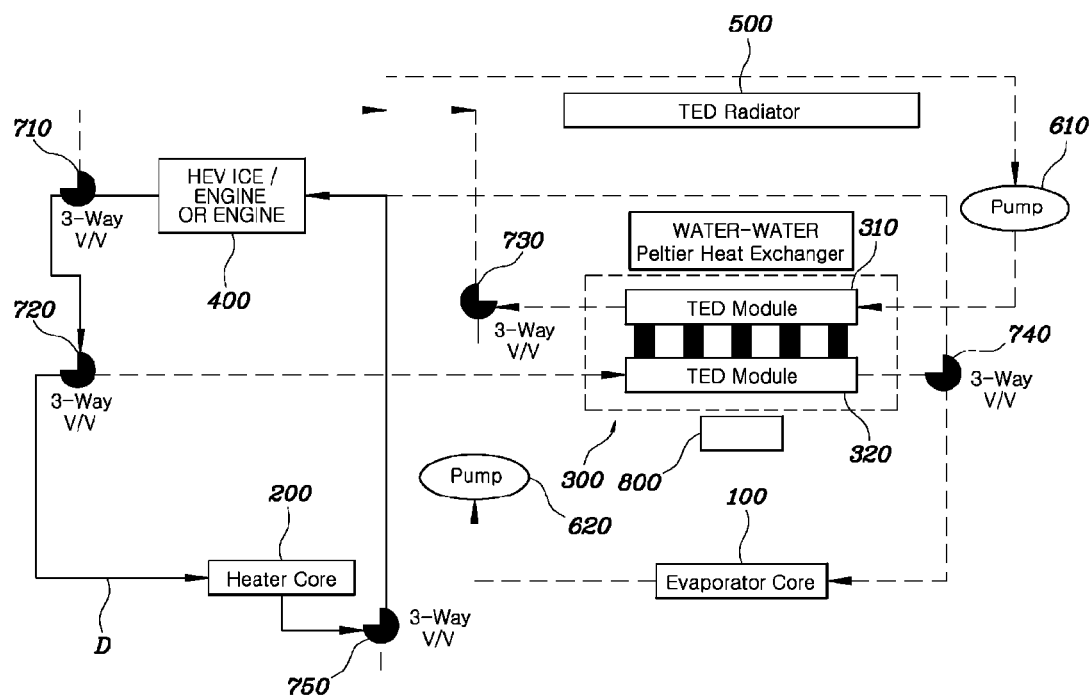
FIG. 1 is a view showing a heating mode in an air-conditioning apparatus for a vehicle according to an exemplary embodiment of the present invention.
Figure 2:
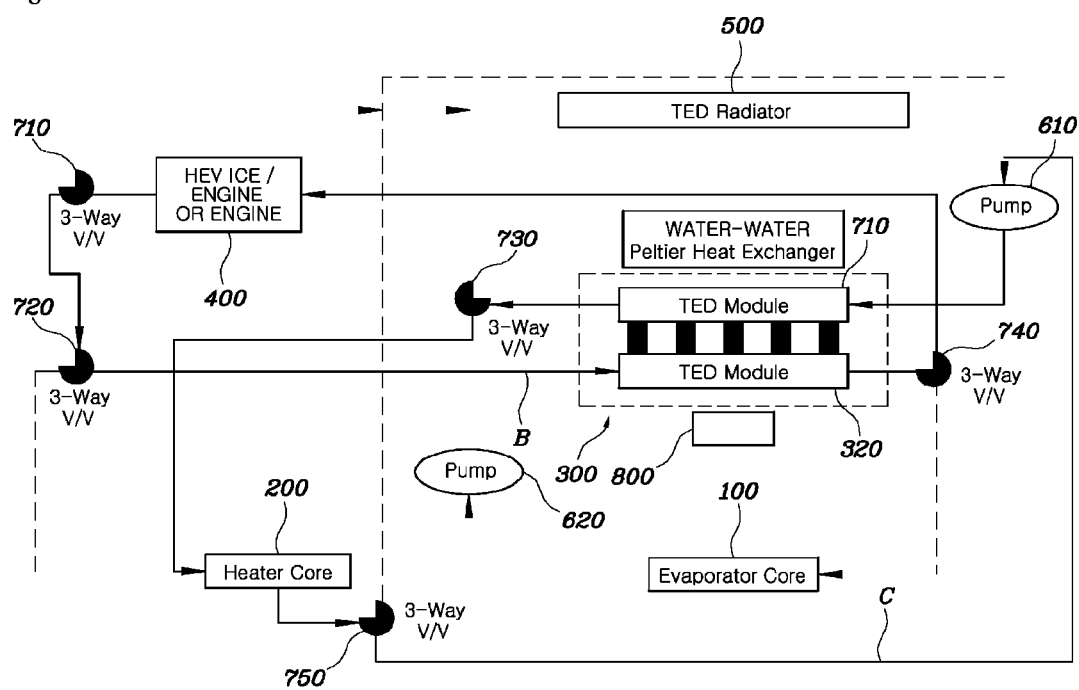
FIG. 2 is a view showing another heating mode in the air-conditioning apparatus for the vehicle shown in FIG. 1.
Figure 3:
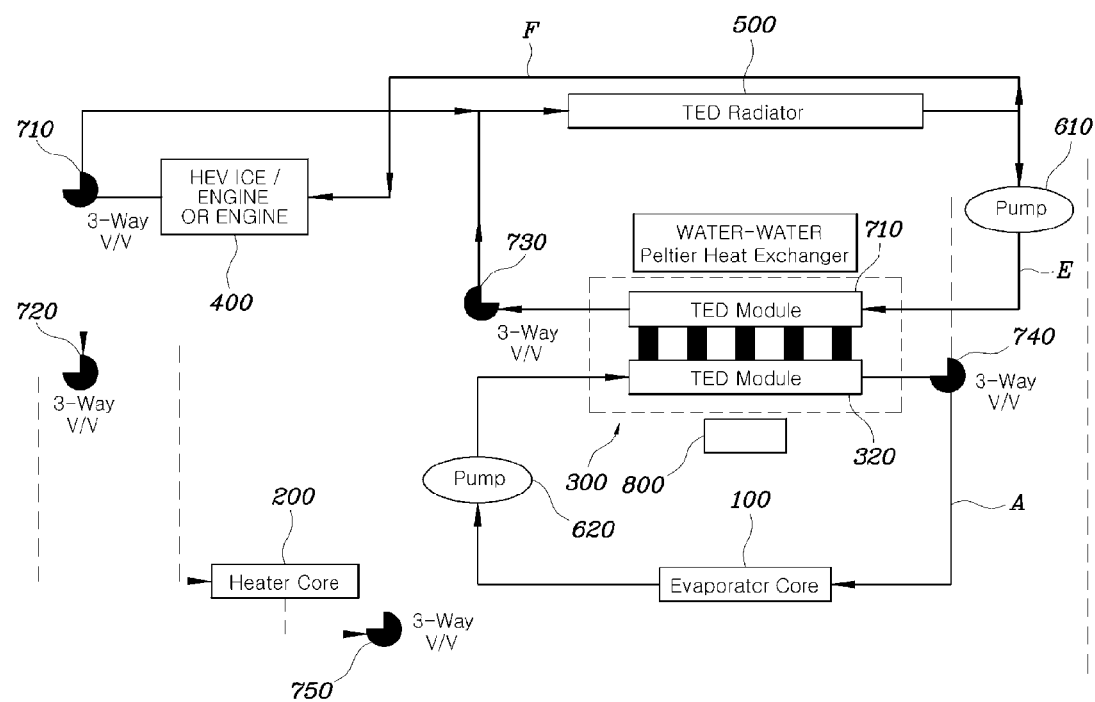
FIG. 3 is a view showing a cooling mode in the air-conditioning apparatus for the vehicle shown in FIG. 1.
Figure 4:
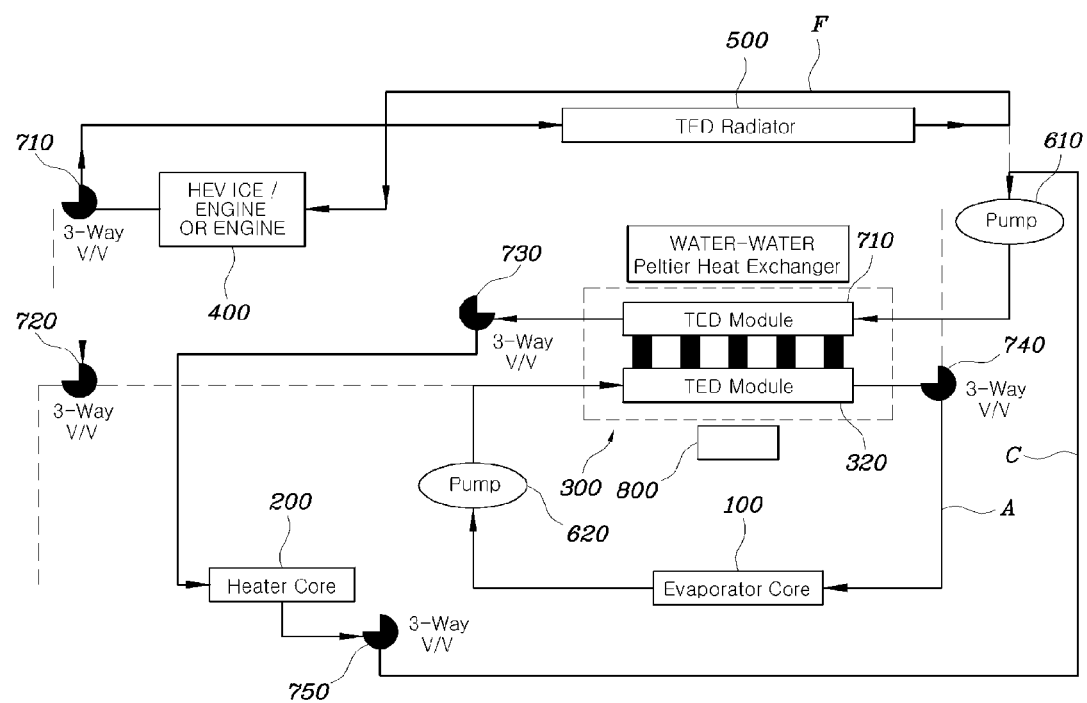
FIG. 4 is a view showing a dehumidifying mode in the air-conditioning apparatus for the vehicle shown in FIG. 1.

FIG. 1 is a view showing a heating mode in an air-conditioning apparatus for a vehicle according to an exemplary embodiment of the present invention. FIG. 2 is a view showing another heating mode in the air-conditioning apparatus for the vehicle shown in FIG. 1. FIG. 3 is a view showing a cooling mode in the air-conditioning apparatus for the vehicle shown in FIG. 1. FIG. 4 is a view showing a dehumidifying mode in the air-conditioning apparatus for the vehicle shown in FIG. 1.

An air-conditioning apparatus for a vehicle according to an exemplary embodiment of the present invention includes an evaporator core 100 and a heater core 200 disposed on a ventilation channel so as to overlap each other, a thermoelectric device 300 having a heat generating surface 310 and a heat absorbing surface 320, a cooling line made up of a first cooling channel A through which cooling water circulates around the heat absorbing surface 320 and the evaporator core 100 and a second cooling channel B through which the cooling water circulates around the heat absorbing surface 320 and an engine 400, a heating line made up of a first heating channel C through which the cooling water circulates around the heat generating surface 310 and the heater core 200 and a second heating channel D through which the cooling water circulates around the engine 400 and the heater core 200, and a controller 800 controlling concurrent circulation through the second cooling channel B and the first heating channel C or circulation through the second heating channel D in a heating mode.

The air-conditioning apparatus of the present invention for the most part makes no use of a refrigerant, a compressor, a condenser, etc. as in the related art. However, due to the use of the cooling water, a radiator is required to cool an engine or heat-generating parts such as a motor, a battery, etc. without doing damage to vehicle layout as much as possible. Further, a heater core and an evaporator core (cooling core) installed on an existing air-conditioning apparatus are also used.

In an existing air-conditioning apparatus (e.g. a heating, ventilation and air conditioning apparatus (HVAC)), both the heater core and the evaporator core are provided, and are installed on a channel for providing an interior of the vehicle with air. The air is adjusted in temperature by a temp door, and then is discharged to the interior. This configuration is equal to that of the air-conditioning apparatus widely known in the related art, and so a detailed description thereof will be omitted.

Meanwhile, to condition the air only with the cooling water, it is necessary to cool or heat the cooling water. To this end, the thermoelectric device is used in place of the compressor. An example of the thermoelectric device includes a Peltier device. It can be understood that the thermoelectric device has the heat generating surface and the heat absorbing surface using electric energy, and operates to pump heat from the heat absorbing surface to the heat generating surface. Thus, the colder the heat absorbing surface, the harder the heat is pumped to the heat generating surface. In contrast, the hotter the heat absorbing surface, the easier the heat is pumped to the heat generating surface.

In the case of the present invention, the evaporator core 100 and the heater core 200 are disposed on the ventilation channel of the existing HVAC in an overlapped state. This configuration is equal to that of the related art. However, the thermoelectric device 300 having the heat generating surface 310 and the heat absorbing surface 320 is provided. The heat generating surface 310 and the heat absorbing surface 320 of the thermoelectric device are connected with the respective channels of the cooling water.

In detail, the cooling line and the heating line are provided. The cooling line is made up of the first cooling channel A through which the cooling water circulates around the heat absorbing surface 320 and the evaporator core 100, and the second cooling channel B through which the cooling water circulates around the heat absorbing surface 320 and the engine 400.

The heating line is made up of the first heating channel C through which the cooling water circulates around the heat generating surface 310 and the heater core 200, and the second heating channel D through which the cooling water circulates around the engine 400 and the heater core 200.

Meanwhile, the controller is configured to control valves or water pumps. Thereby, in a heating mode, the controller controls circulation through the second cooling channel B and first heating channel C at the same time, or circulation through the second heating channel D. In a cooling mode, the controller 800 may be configured to control circulation through the first cooling channel A. Thereby, the evaporator core or the heater core is cooled or heated only by the thermoelectric device and the cooling water. As a result, the air-conditioning of an interior of the vehicle is performed efficiently and in an environmentally friendly manner.

Further, radiation for cooling a vehicle part such as an engine, a motor, or a battery is also taken into consideration. In this respect, an air-conditioning apparatus for a vehicle according to another exemplary embodiment of the present invention includes an evaporator core 100 and a heater core 200 disposed on a ventilation channel in an overlapped state, a thermoelectric device 300 having a heat generating surface 310 and a heat absorbing surface 320, a cooling line made up of a first cooling channel A through which cooling water circulates around the heat absorbing surface 320 and the evaporator core 100 and a second cooling channel B through which the cooling water circulates around the heat absorbing surface 320 and an engine 400, a heating line made up of a first heating channel C through which the cooling water circulates around the heat generating surface 310 and the heater core 200 and a second heating channel D through which the cooling water circulates around the engine 400 and the heater core 200. In addition, a radiating line made up of a first radiating channel E through which the cooling water circulates around the heat generating surface 310 and a radiator 500 and a second radiating channel F through which the cooling water circulates around the engine 400 and the radiator 500 is also provided. Furthermore, a controller 800 configured to control the circulation through the first cooling channel A, the first radiating channel E, and the second radiating channel F in a cooling mode. In this case, by adding the radiating line using the radiator 500, the engine is adapted to be radiated by the cooling water as well.

In detail, the thermoelectric device 300 is provided with the heat generating surface 310 and the heat absorbing surface 320. The heat absorbing surface 320 forms the first cooling channel A through the cooling water circulating along with the evaporator core 100. Thereby, the cooling of the interior of the vehicle is performed.

The heat absorbing surface 320 makes up the second cooling channel B which is connected with the engine 400 and through which the cooling water circulates. Thereby, if necessary, the engine 400 is cooled, and simultaneously waste heat from the engine 400 is pumped to the heat generating surface 310.

Furthermore, the heat generating surface 310 of the thermoelectric device makes up the first heating channel C along with the heater core 200. As a result the interior of the vehicle is heated by the heat generation from the thermoelectric device.

The engine 400 makes up the second heating channel D along with the heater core 200. Thereby, the heating of the interior of the vehicle is performed by the water heat of the engine 400. The heat generating surface 310 of the thermoelectric device makes up the first radiating channel E along with the radiator 500. Thereby, the heat of the heat absorbing surface 320 is pumped and discharged to the outside, thereby increasing cooling efficiency. The engine 400 makes up the second radiating channel F along with the radiator 500. Thereby, the waste heat from the engine can be discarded.

First, FIG. 1 is a view showing a heating mode in an air-conditioning apparatus for a vehicle according to an exemplary embodiment of the present invention. In the heating mode, the controller 800 controls the circulation through the second heating channel D. Thereby, the heater core 200 is heated to perform the heating by the waste heat of the engine 400. This corresponds to a case in which a conventional internal combustion engine or an engine of a hybrid vehicle is operated to generate heat. Alternatively, in the case of the hybrid vehicle, the waste heat from an electric part such as a motor or a battery in addition to the engine may be used as well.

FIG. 2 is a view showing another heating mode in the air-conditioning apparatus for the vehicle shown in FIG. 1. In this case, in the heating mode, the controller 800 controls the concurrent circulation through the second cooling channel B and the first heating channel C, and thereby heating of the interior of the vehicle can be performed. In this case, heating is performed via the thermoelectric device 300. Particularly, to make utmost use of a characteristic of the thermoelectric device in which, as the temperature of the heat absorbing surface 320 becomes is at a higher temperature, the temperature of the heat generating surface 310 also becomes high, and the circulation through the second cooling channel B along with the engine 400 is performed. Thereby, the heating efficiency can be further increased.

FIG. 3 is a view showing a cooling mode in the air-conditioning apparatus for the vehicle shown in FIG. 1. In this case, in the cooling mode, the controller 800 controls the circulation through the first cooling channel A. To increase the efficiency of the thermoelectric device 300 to the utmost, it is necessary to reduce the temperature of the heat generating surface 310. To this end, under the control of the controller 800, the heat generating surface 310 is connected with the radiator 500 by the first radiating channel E, and thereby the radiating is performed. Simultaneously, to cool the engine 400, the circulation through the second radiating channel F is also performed, and thus the radiation can be performed by the radiator 500.

FIG. 4 illustrates a dehumidifying mode in the air-conditioning apparatus for the vehicle shown in FIG. 1. In this case, both the evaporator core 100 and the heater core 200 should be operated. Thus, to this end, in a dehumidifying mode, the controller 800 controls the circulation through the second radiating channel F, the first cooling channel A, and the first heating channel C. That is, cooling is performed by the heat absorbing surface 320 of the thermoelectric device 300, and the heating is performed by the heat generating surface 310. Accordingly, in this case, the efficiency of the thermoelectric device is maintained in a very high state even when the heat is not circulated separately. Thus, less electric energy for the thermoelectric device is consumed. To cool the engine 400, the second radiating channel F may be separately operated.

All of the cooling channels, the heating channels, and the radiating channels described above may be controlled by the valves and the water pumps under the control of the controller. To design compact channels by simplifying the configuration of the system, the following design of the channels will be useful. However, this configuration is for exemplary purposes only.

In detail, the first cooling channel A and the second cooling channel B may be connected in parallel so as to share input and output sides of the heat absorbing surface 320. A 3-way valve 740 may be installed at a branch point of the output side of the heat absorbing surface 320. A first water pump 620 may be provided within the first cooling channel A. Thus, a circulating force of the cooling water for cooling is provided by the water pump 620.

The first heating channel C and the first radiating channel E may be connected in parallel so as to share input and output sides of the heat generating surface 310. A 3-way valve 730 may be installed at a branch point of the output side of the heat generating surface 310. A second water pump 610 may also be installed between a joining point of the input side of the heat generating surface 310 and the heat generating surface 310, and thus a circulating force for the cooling water may be provided to the heat generating surface. In the case of the engine, the circulation of the cooling water can be applied using a water pump of an engine side of an existing vehicle.

Further, the second cooling channel B and the second radiating channel F are connected in parallel so as to share an inlet and outlet of the engine 400. A 3-way valve 710 is installed at a joining point of the inlet side of the engine 400. The second heating channel D is formed at the outlet side of the engine 400 so that the second cooling channel B diverges therefrom through a 3-way valve 720. The first heating channel C and the second heating channel D are connected in parallel so as to share an inlet and outlet of the heater core 200. A 3-way valve 750 is installed at a branch point of the outlet side of the heater core 200.

Accordingly, the exemplary embodiment of the present invention provides an air conditioning system that utilizes a cooling water circulating system in a simplified form. Advantageously, a cycle structure capable of performing heating, cooling, and dehumidifying is controlled by merely valves and the water pumps, and simultaneously the air-conditioning efficiency may be increased using appropriate radiation and waste heat from vehicle parts such as the engine can be achieved.

According to the air-conditioning apparatus having the above-mentioned configuration, both an air-conditioning system and a vehicle cooling system can be operated together using only the cooling water with the refrigerant removed from an existing refrigerant-based air-conditioning apparatus.

As a result, environmental effects can be achieved. Furthermore, the air-conditioning system for the interior of the vehicle as well as the cooling system for an engine is provided, and optimized heat control is performed by the compact system. Thereby, waste heat can be reduced, and the waste of energy can be prevented.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An air-conditioning apparatus for a vehicle, comprising:
    an evaporator core and a heater core disposed on a ventilation channel overlapping each other;
    a thermoelectric device having a heat generating surface and a heat absorbing surface;
    a cooling line including a first cooling channel through which cooling water circulates around the heat absorbing surface and the evaporator core, and a second cooling channel through which the cooling water circulates around the heat absorbing surface and an engine;
    a heating line including a first heating channel through which the cooling water circulates around the heat generating surface and the heater core, and a second heating channel through which the cooling water circulates around the engine and the heater core; and
    a controller configured to control concurrent circulation through the second cooling channel and the first heating channel or circulation through the second heating channel in a heating mode via control of one or more valves.

2. The air-conditioning apparatus according to claim 1, wherein the controller is configured to control circulation through the first cooling channel in a cooling mode.

3. An air-conditioning apparatus for a vehicle, comprising:
    an evaporator core and a heater core disposed on a ventilation channel in an overlapped state;
    a thermoelectric device having a heat generating surface and a heat absorbing surface;
    a cooling line including a first cooling channel through which cooling water circulates around the heat absorbing surface and the evaporator core, and a second cooling channel through which the cooling water circulates around the heat absorbing surface and an engine;
    a heating line including a first heating channel through which the cooling water circulates around the heat generating surface and the heater core, and a second heating channel through which the cooling water circulates around the engine and the heater core;
    a radiating line including a first radiating channel through which the cooling water circulates around the heat generating surface and a radiator, and a second radiating channel through which the cooling water circulates around the engine and the radiator; and
    a controller configured to control the circulation through the first cooling channel, the first radiating channel, and the second radiating channel in a cooling mode.

4. The air-conditioning apparatus according to claim 3, wherein the controller controls circulation through the second radiating channel, the first cooling channel, and the first heating channel in a dehumidifying mode.

5. The air-conditioning apparatus according to claim 3, wherein the controller is configured to control concurrent circulation through the second cooling channel and the first heating channel or circulation through the second heating channel in a heating mode.

6. The air-conditioning apparatus according to claim 3, wherein the first cooling channel and the second cooling channel are connected in parallel to share input and output sides of the heat absorbing surface, and a 3-way valve is installed at a branch point of the output side of the heat absorbing surface.

7. The air-conditioning apparatus according to claim 3, wherein the first cooling channel includes a first water pump.

8. The air-conditioning apparatus according to claim 3, wherein the first heating channel and the first radiating channel are connected in parallel to share input and output sides of the heat generating surface, and a 3-way valve is installed at a branch point of the output side of the heat generating surface.

9. The air-conditioning apparatus according to claim 8, wherein a second water pump is installed between a joining point of the input side of the heat generating surface and the heat generating surface.

10. The air-conditioning apparatus according to claim 3, wherein the second cooling channel and the second radiating channel are connected in parallel so as to share an inlet and outlet of the engine, and a 3-way valve is installed at a joining point of the inlet side of the engine.

11. The air-conditioning apparatus according to claim 10, wherein the second heating channel is formed at the outlet side of the engine wherein the second cooling channel diverges therefrom through a 3-way valve.

12. The air-conditioning apparatus according to claim 3, wherein the first heating channel and the second heating channel are connected in parallel so as to share an inlet and outlet of the heater core, and a 3-way valve is installed at a branch point of the outlet side of the heater core.

* * * * *